United States Patent [19]

Campbell et al.

[11] Patent Number: 4,540,357
[45] Date of Patent: Sep. 10, 1985

[54] APPARATUS FOR FABRICATING NON-LINEAR SIDE WALL CONVEYOR BELTING

[75] Inventors: Clarence R. Campbell, Salt Lake City; Elliot S. Mickelson; Steven A. Baumgartner, both of West Valley City, all of Utah

[73] Assignee: Cambelt International Corporation, Salt Lake City, Utah

[21] Appl. No.: 557,634

[22] Filed: Dec. 2, 1983

[51] Int. Cl.³ ........................ B29D 29/00; B29H 7/22
[52] U.S. Cl. ................................. 425/28 B; 264/280; 425/395
[58] Field of Search ............... 425/394, 28 B, 28 R, 425/DIG. 5, DIG. 108; 264/280, 284, 347, DIG. 70; 156/137

[56] References Cited

U.S. PATENT DOCUMENTS

| | | | |
|---|---|---|---|
| 2,362,659 | 11/1944 | Miller | 264/325 |
| 2,572,984 | 10/1951 | Byers | 425/DIG. 5 |
| 2,718,030 | 9/1955 | Collins et al. | 425/411 |
| 2,782,461 | 2/1957 | Esslinger | 425/394 |
| 2,831,215 | 4/1958 | Piemont | 156/137 |
| 2,859,477 | 11/1958 | Millhoff | 425/233 |
| 3,041,661 | 7/1962 | Elliott | 264/284 |
| 3,129,806 | 4/1964 | Stiltner | 198/821 |
| 3,482,004 | 12/1969 | Anderson | 264/25 |
| 3,711,588 | 1/1973 | Piemont | 264/347 |
| 3,860,684 | 1/1975 | Vance, Sr. | 264/157 |
| 3,895,895 | 7/1975 | Märker et al. | 425/78 |
| 3,897,291 | 7/1975 | Hoback et al. | 156/138 |
| 3,975,490 | 8/1976 | Lapeyre | 264/250 |
| 4,038,119 | 7/1977 | Lambert | 156/163 |
| 4,078,032 | 3/1978 | Wenner | 264/167 |
| 4,115,510 | 9/1978 | Previati | 264/347 |

FOREIGN PATENT DOCUMENTS

| | | | |
|---|---|---|---|
| 2429698 | 1/1976 | Fed. Rep. of Germany | 425/394 |
| 1119079 | 7/1968 | United Kingdom | 425/28 B |
| 1292929 | 10/1972 | United Kingdom | |

*Primary Examiner*—Jay H. Woo
*Assistant Examiner*—Joye Woodard
*Attorney, Agent, or Firm*—Workman, Nydegger & Jensen

[57] ABSTRACT

The present invention provides apparatus for fabricating non-linear side wall conveyor belting wherein the non-linear side walls are cured simultaneously with the conveyor belting with which they are associated, thereby providing a much stronger attachment than obtainable through use of conventional adhesives or a thermal bonding process. The apparatus of the invention comprises a novel mold having fixed inner side wall mold components and movable outer side wall mold components adapted for movement between an open position, wherein the outer side wall mold component is spaced from the corresponding inner side wall mold component in order to permit insertion of side wall material, and a closed position wherein the side wall mold components are substantially engaged so as to form the side wall material into a suitable non-linear shape. The outer side wall mold components are moved from the open to closed positions by means of wedge members forced between respective fixed backing bars and the outer side wall mold components. Suitable conditions of heat and pressure are then brought to bear on the mold for a duration adequate to insure complete curing of the side walls and conveyor belt material.

9 Claims, 10 Drawing Figures

APPARATUS FOR FABRICATING NON-LINEAR SIDE WALL CONVEYOR BELTING

BACKGROUND

1. Field of the Invention

The present invention relates to methods and apparatus for fabricating continuous length conveyor belting. More particularly, the present invention is directed to methods and apparatus for fabricating belting having undulated flexible side walls.

2. The Prior Art

Conveyor belts are widely used for moving various materials from one location to another. In its simplest form, a conveyor belt is comprised of a flat belt secured end-to-end so as to form an elongated loop, and is used by being passed around a pair of rollers located at the ends of the elongated loop, and with intermediate supporting rollers or slide plates situated therebetween. Being fabricated from a lamination of fabric and rubber (or a rubber-like material), a typical flat conveyor belt is capable of sustained operation before substantial degradation occurs.

Simple flat conveyor belts are adequate for moving large or packaged materials, and when used in a trough-like configuration or provided with side flanges which protrude upwardly from the body of the belt so as to serve as side walls, they may be used to move a large variety of bulk materials, since the trough configuration or side walls will prevent bulk materials from sliding off the edges of the belt. When it is desired to elevate bulk materials, it is often necessary to further provide a flat belt with either cleats or nubs to prevent the material from sliding back down the belt as it is conveyed.

It has been found possible to utilize a simple straight side wall in application where a relatively low wall is all that is required to prevent the bulk materials from sliding off the edges of the belt, but even when a very resilient material is utilized to fabricate a high straight side wall (e.g., above about two inches high), the substantial stress applied to the upper portions of such high walls as they pass around the end rollers of a conveyor assembly results in rapid degradation of the belt.

To avoid these limitations, it has become increasingly common to provide conveyor belts with side walls having a sinusoidal or other non-linear shape. These undulated side walls relieve the stress on the wall as the belt passes around the rollers. Adjustment of the spacing between undulations and adjustment of the magnitude of the undulations allows virtually any height of side-wall to be utilized without concern over premature failure of the side wall material.

Conveyor belts are made by laminating raw stock material (e.g., natural rubber, black styrene-butadiene rubber, neoprene, nitrile, or other synthetic material, hereinafter referred to generally as "rubber stock", or sometimes simply "stock") with layers of a suitable fabric so as to meet a desired specification of tensile strength, and the like. The formed belt is then cured under conditions of heat and pressure sufficient to cause vulcanization.

In the past, when it has been desired to add low straight side walls, it has been found advantageous to prepare raw side walls and place them in a recess in the belt mold so that each component is cured together with the conveyor belt. The substantial heat and pressure utilized to cure the raw material results in substantial homogeneity between the side walls and the conveyor belt to which they are secured. This simultaneous curing results in a much stronger bond between the belt and side walls than is obtainable if already cured side walls are secured to cured belting by use of adhesives or a purely thermal process.

Unfortunately, it has not proven feasible to produce conveyor belts having non-linear or other non-linear side walls using existing technology so as to simultaneously cure the side walls and the belt. Rather, current technology involves the multiple steps of (1) curing the required length of flat belt; (2) placing straight rubber side wall stock into a mold to form it into the desired non-linear pattern; (3) curing the raw non-linear side wall stock; (4) cleaning and buffing those areas of the flat belt and the non-linear wall that are to be secured together; and (5) applying adhesive so as to bond the non-linear wall to the flat belt.

The result of this approach for fabricating non-linear side wall conveyor belts has been that after some period of use, although the belt and non-linear side wall material might still be in excellent condition, it is not uncommon for the non-linear side wall to become delaminated from the belt due to failure of the bonding process. This condition results in equipment downtime while the belt is repaired or replaced, and also results in increased maintenance and inventory expenses.

In view of the foregoing it will be appreciated that it would be a significant advancement in the field of conveyor belt fabrication if apparatus could be provided that would permit the simultaneous curing of raw non-linear side walls with raw belt material so as to successfully avoid the aforementioned problems.

PRINCIPAL OBJECTS AND BRIEF SUMMARY OF THE INVENTION

In view of the foregoing problems experienced with the conventional apparatus for fabricating non-linear flexible side wall belting, it is a primary object of the present invention to provide improved apparatus that will permit economical simultaneous curing of non-linear side wall material with conveyor belting material so as to obtain a substantially stronger bond than is available through use of adhesive or a thermal bonding process and thereby substantially increasing the productive lifetime of non-linear side wall conveyor belt.

It is another primary object of the present invention to provide improved apparatus for fabricating non-linear side wall conveyor belting requiring fewer steps and less equipment operator attention than required in conventional manufacturing techniques.

It is yet a further important object of the present invention to provide apparatus for economically producing non-linear side wall conveyor belting utilizing existing presses without the need for substantial retooling of existing conveyor belt factories.

These and other objects and features of the present invention will become more fully apparent from the following description and appended claims taken in conjunction with the accompanying drawings.

In accordance with the foregoing principal objects, the present invention is directed to novel apparatus for fabricating non-linear side wall conveyor belting. A presently preferred embodiment of the apparatus of the present invention is provided with a fixed inner side wall mold component conformed to the desired inner wall configuration of the non-linear side wall, and a movable outer side wall mold component conformed to the desired outer wall configuration. In use, the outer side wall mold component is spaced from the inner wall mold component to a distance sufficient to permit placement of substantially straight uncured side wall stock therebetween. Conventional uncured belting is then layed up in contiguous relationship with the side wall stock. Advantageously, a ramp member is provided that is adapted for placement between the outer wall mold component and a fixed backing support member. This ramp member is forced by the platens of a press into a position between the backing support member and the outer wall mold component as the platens of the press come together on the mold, thereby translating the outer wall mold component laterally a predetermined distance toward the inner side wall mold component so as to form the uncured side wall material into the desired non-linear shape. The platens, together with heat, then serve to simultaneously cure the non-linear side wall and the conveyor belting material into a unitary, flexible side wall belt.

DETAILED DESCRIPTION OF THE INVENTION

The present invention can best be understood by reference to the drawings, wherein like parts are designated with like numerals throughout.

Figure 1:
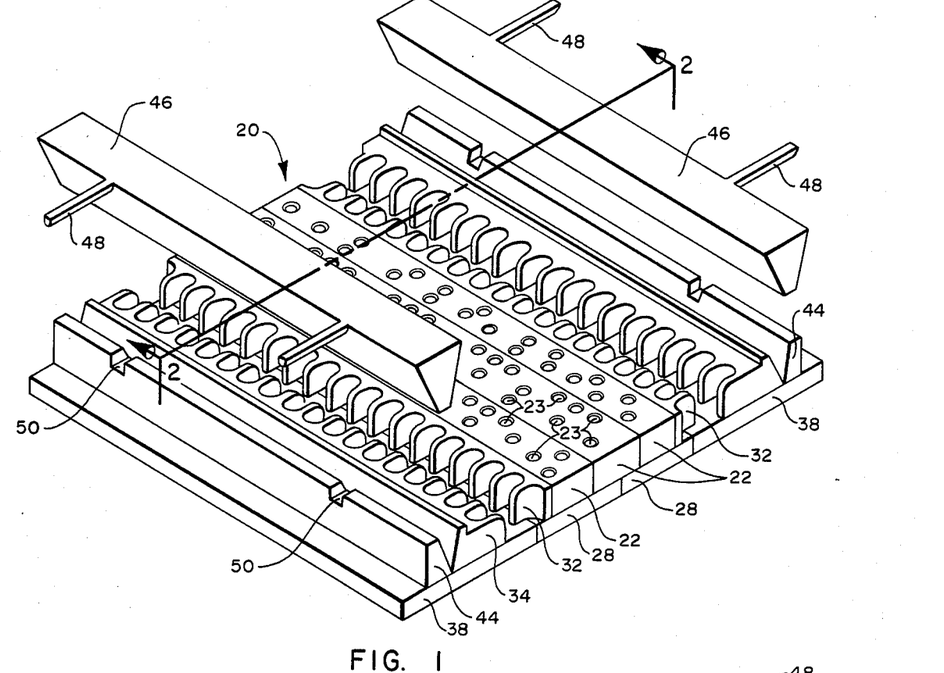
FIG. 1 is a perspective view of a presently preferred embodiment of a novel mold constructed in accordance with the present invention.

FIG. 1 illustrates a section of a presently preferred embodiment of a mold 20 constructed according to the present invention. Mold 20 advantageously includes one or more belt pattern mold components 22. As shown in FIGS. 1–4 and 9a and 9b, belt mold components 22 illustrated in the Figures are provided with nub cavities 23 adapted for forming nubs 24 (see FIG. 9a) extending from the surface of conveyor belting 26. Optionally, belt pattern mold components 22 could be replaced with corresponding mold components (not shown) having a flat surface for constructing flat belts, or cleat patterns for constructing cleated belts, or other desired patterns.

Figure 2:
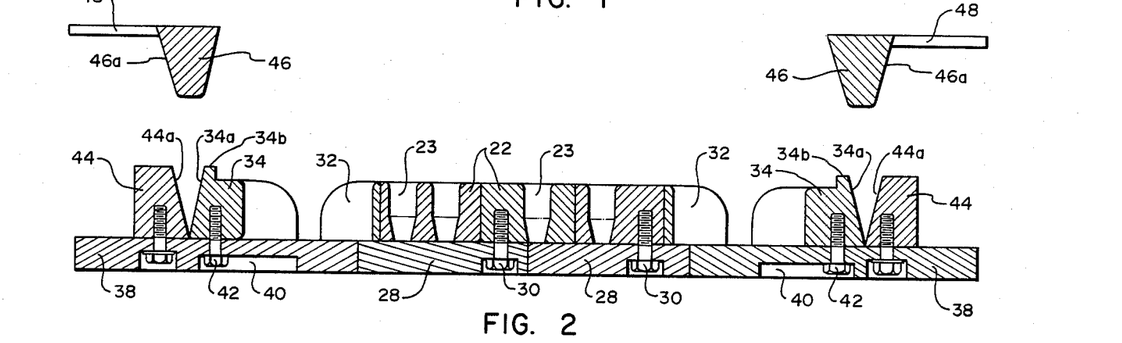
FIG. 2 is a cross-sectional view of the mold of FIG. 1 taken along line 2—2 of FIG. 1.
Figure 3:
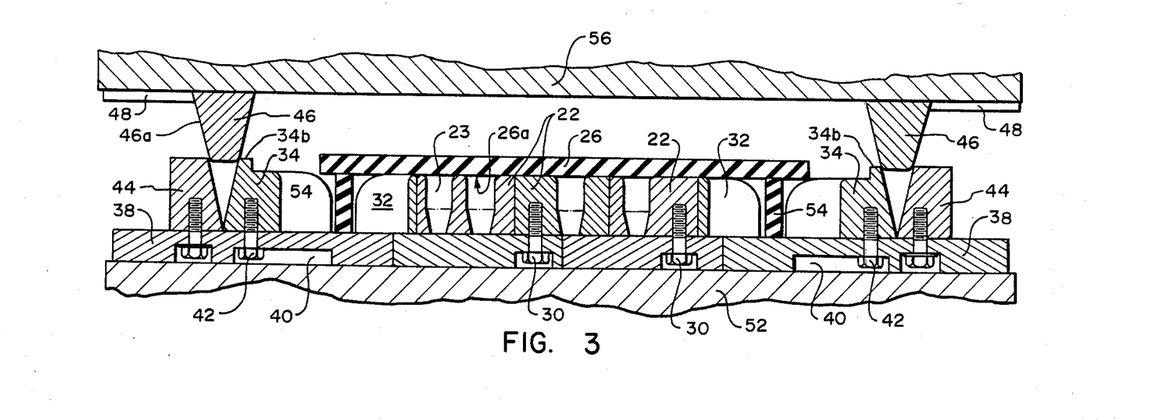
FIG. 3 is a cross-sectional view similar to FIG. 2 showing the mold and side wall stock and conveyor belting stock placed therein, with the mold being illustrated in position between closing platens of a press, part of said platens being broken away for convenience of illustration.
Figure 4:
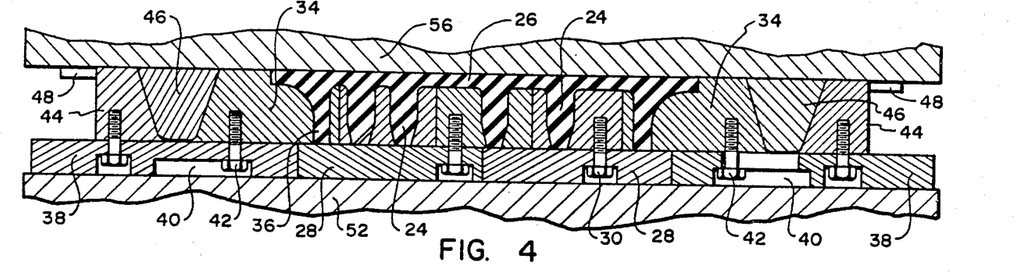
FIG. 4 is a view similar to FIG. 3 showing the mold, together with side wall and belting material, in position between closed platens of a press during the curing process.

As best seen in FIGS. 2-4, belt pattern mold components 22 are advantageously secured to base plates 28, such as by bolts 30. Utilization of a pair of base plates 28, as shown, allows for fabricating various widths of conveyor belt by adding additional belt pattern mold components and additional base plates intermediate those illustrated, thereby providing great flexibility in designing a conveyor belt for any particular situation.

Also advantageously attached to base plates 28 are inner side wall mold components 32 conforming in shape to a desired inner wall configuration of a non-linear side wall. In the illustrated embodiment, an non-linear configuration is preferred. Corresponding outer side wall mold components 34 are likewise provided, having a conformation corresponding to the desired configuration of the outer wall of the non-linear side wall. Use of side wall components 32 and 34 having the configuration illustrated in the drawings results in formation of non-linear side walls 36 having the configuration shown in FIG. 9a.

Unlike inner side wall mold components 32 that are affixed to underlying base plate 28, the outer side wall mold components of the illustrated embodiment are free to slide laterally along base plates 38. Optionally, slots 40 may be provided in base plate 38, with loosely fitted bolts 42 passing therethrough and into outer side wall mold components 34, said bolts and slots serving as guides when moving the outer side wall mold components from the open position illustrated in FIGS. 2 and 3 to the closed position illustrated in FIG. 4. Alternatively, in place of bolts 42 and slots 40, the mold may be provided with keys and complementary keyways (not shown). Backing bars 44 are mounted to base plate 38 at a position corresponding to the outer range of movement of outer side wall components 34 when in the open position.

Advantageously, the upper portions of adjacent faces 44a and 34a, respectively, of backing bars 44 and outer side wall mold components 34 are tapered so as to facilitate insertion of a ramp member 46 therebetween. Although any suitable ramp configuration could be used, member 46 is advantageously formed as a wedge corresponding to the taper of backing bars 44a and outer side wall mold components 34a. In order to assist in manual placement and removal of wedge member 46 during use of mold 20 when fabricating conveyor belting, handles 48 are also advantageously provided. When handles 48 are provided, it is also advantageous to provide recesses 50 in backing plates 44 so as to permit wedges 46 to be completely seated, with the upper surface thereof being substantially level with the upper surfaces of backing bars 44 and the outside edges 34b of the outer side wall mold components. Proper selection of a width for wedge members 46 permits adjustment of the spacing between the inner and outer side wall mold components when the wedge members are secured, thereby permitting adjustment of the thickness of the non-linear side walls formed.

FIGS. 3 and 4 illustrate generally the operation of a mold 20 and FIGS. 5-8 illustrate how a series of mold sections according to the present invention may be aligned end-to-end and used to fabricate continuous lengths of belting.

With outer side wall mold components 34 moved to an open position, substantially straight raw side wall material 54 formed from a suitable rubber stock is placed adjacent to the inner side wall mold components. After placement of such side wall material, wedge members 46 are placed into the grooves existing between backing bars 44 and outer side wall mold components 34 due to the tapered shapes of the adjacent faces thereof. Previously laid-up raw belting material 26 is placed over belt pattern mold components 22 and raw side wall material 54. Such belting material typically includes several layers of rubber stock and weaved fabric. Finally, upper press platen 56 is lowered (or, more typically, lower press platen 52 is raised). FIG. 3 illustrates the position of the platens where upper platen 56 first comes in contact with wedge members 46.

As the platens continue to come together, wedge members 46 are forced downward to a position inserted between backing bars 44 and outer side wall mold components 34, thereby translating the downward force of the press to a lateral force and thus displacing the outer side wall mold components to the closed position illustrated in FIG. 4. The side wall material is thus formed into the desired non-linear shape and is properly positioned for curing together with conveyor belting 26. Platens 52 and 56 are heated to a suitable temperature, typically about 300° F., and are forced together to a typical pressure of about 1800 pounds per square inch gauge for about thirty (30) minutes to effectively cure the raw rubber stock of the belting material, side walls, and and desired cleats or nubs into a unitary molded belt.

As mentioned above, the raw conveyor belting material is comprised of alternating layers of rubber stock and a weaved fabric, with a final layer of rubber stock. It has been found extremely advantageous to prepare the uncured conveyor belting so that the side 26a of such belting material to which the side walls are to be affixed has an excess thickness of rubber stock beyond that called for in the specification. Under the conditions of heat and pressure referred to above, this excess rubber stock will flow into any nub cavities 23 provided, and also into any space between the side wall molds and the side wall material 54 so as to fill any voids in the non-linear side walls. It will be appreciated that the amount of excess rubber stock needed on the surface of the uncured belting material will depend upon the volume of nub cavities 23 and voids around side wall material 54 when formed into the desired non-linear shape (or voids around cleats if a cleated belt is formed).

Figures 9A, 9B:
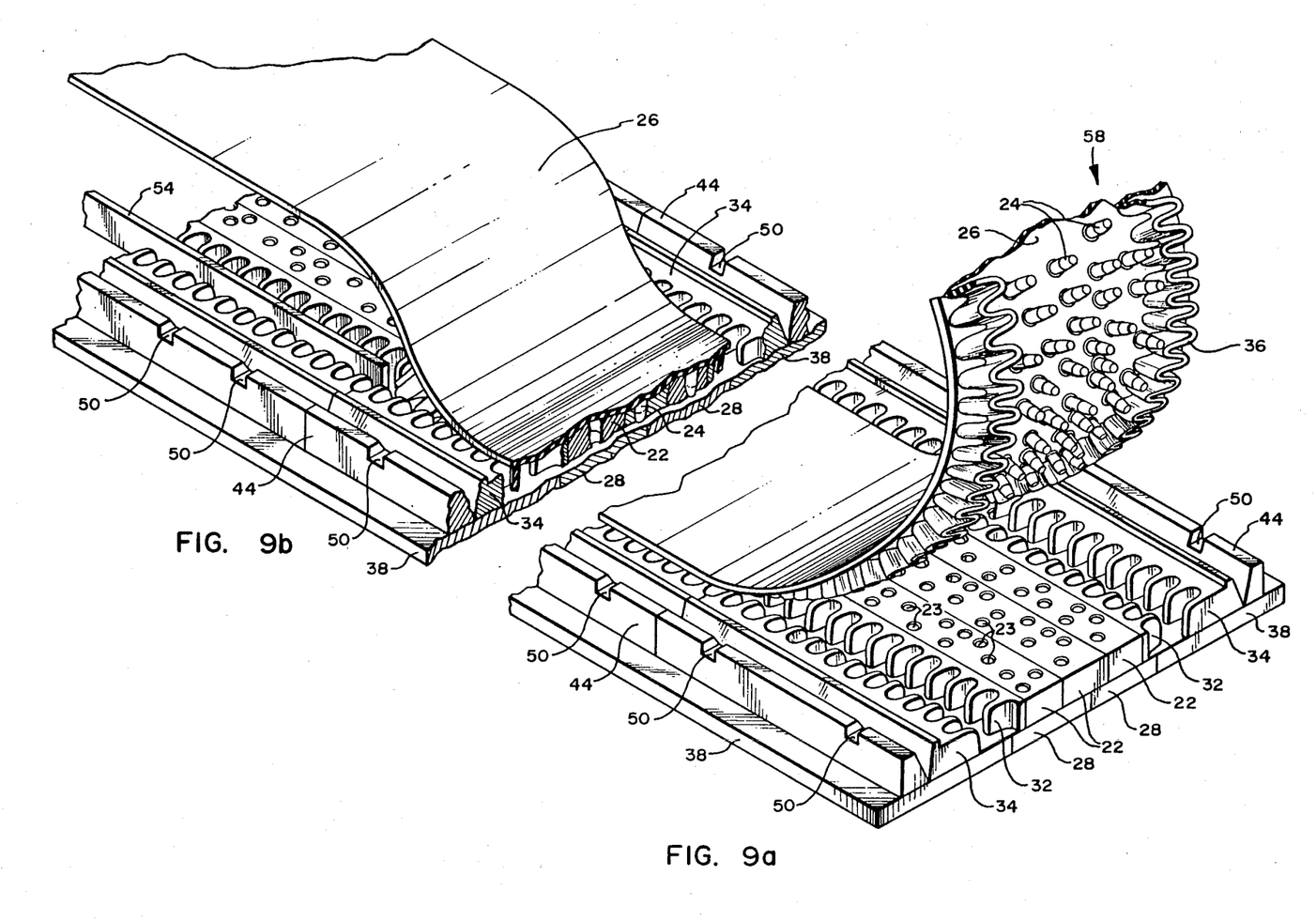
FIG. 9a is a perspective view of the leading two sections of the mold assembly represented schematically in FIGS. 5-8, showing cured conveyor belting being removed from the leading end mold section in preparation for advancement of uncured material into the mold.
FIG. 9b is a perspective view of the mold assembly of FIG. 9a showing placement of uncured side wall material.

The result of the foregoing is a cured unitary conveyor belt 58 having non-linear side walls and a desired belt pattern, as illustrated in FIG. 9a. As depicted in FIG. 4, nubs 24 and side walls 54 are cured simultaneously with belting material 26 so that there is no discernible boundary or point of adhesion therebetween.

One advantage of the foregoing is that the side wall material can be formed from a different rubber stock than that used in the conveyor belting, thereby permitting substantially independent selection of appropriate materials and formulations to give desired conditions of flexibility, abrasion-resistance, and the like, for the various components of the conveyor belting. The only requirement is that the various materials selected be compatible so that they will cure together in a substantially homogeneous fashion so as to become unified upon curing.

After cure is complete, the platens are separated and wedge members 46 removed so as to permit retraction once more of outer side wall mold components 34 to the open position of FIG. 3, thereby permitting repetition of the foregoing steps. It is to be appreciated that although the presently preferred embodiment illustrated in the Figures provides handles 48 for use in manually placing and removing wedge members 46, it would also be possible to secure the wedge members to platen 56 so as to move into and out of position between backing bars 44 and outer side wall mold components 34 without the need for manual operations.

It is to be understood that whereas the illustrated embodiment utilizes horizontally slidable outer side wall mold components 34 together with wedge members 46, other embodiments are possible for bringing the inner and outer side wall components together so as to form the side wall material into an non-linear shape. For instance, outer side wall components 34 and wedge members 46 could be constructed as a single unit (not shown) so that composite wedge/side wall mold components would be removed when positioning side wall material adjacent to the inner side wall mold component. Then, the force of opposing platens as the press closed would simultaneously force the outer side wall mold downward and inward, thereby forming non-linear side walls. It would also be possible to utilize hydraulic or mechanical lever action to force the outer side wall mold section laterally in place of the wedge disclosed in connection with the presently preferred embodiment.

It would also be possible to have the outer side wall mold component secured at an appropriate position, and to attach the inner side wall component to a removable wedge (not shown), although this configuration would be cumbersome to operate. Other modifications are also conceivable within the scope of the present invention.

Figure 5:
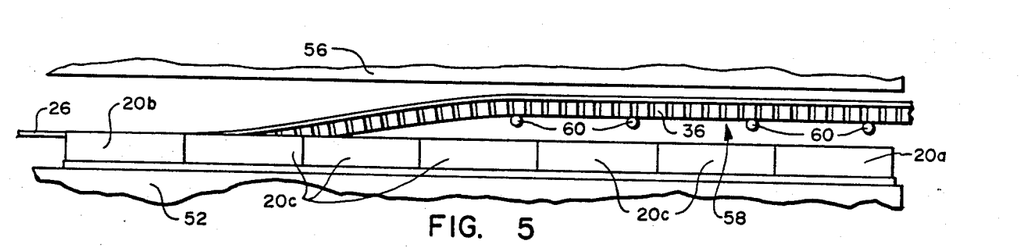
FIG. 5 is a schematic side view representation of a press and series of mold sections constructed in accordance with the present invention and aligned end-to-end between the platens of an elongated press, illustrating the step of removing cure conveyor belting from the leading end of the press when forming continuous length belting.

Returning to a discussion of the illustrated embodiment, in practice it is anticipated that various mold lengths will be fabricated depending upon the size of the press and milling equipment available with which to fabricate the molds. However, for purposes of explanation, FIG. 5 illustrates the use of a plurality of mold sections aligned end-to-end upon a lower platen 52, wherein is illustrated the use of seven mold sections placed end-to-end. Although from the following discussion it will become apparent that the end mold sections should be relatively short, it will also be appreciated that the intermediate mold sections could comprise a single long mold section rather than several short mold sections.

FIGS. 5-8 illustrate the method of use of the novel mold section described above to fabricate conveyor belting many times longer than the length of the press comprising platens 52 and 56. In these Figures, uncured belting and side wall material are introduced from the left, and cured conveyor belting exits to the right.

FIG. 5 depicts a situation that exists after some indeterminate length of conveyor belting has already been fabricated. Thus, in FIG. 5, fabricated conveyor belting 58, being completely cured and ready for use, is in the process of being removed from the mold sections, starting at the leading mold section 20a on the right of the Figure, and working backwards toward the trailing mold section 20b. As it is removed from the mold, the cured belting is advantageously suspended slightly below upper platen 56 such as by means of rods 60 (held by supports that are omitted from the Figures for convenience of illustration).

When forming continuous lengths of conveyor belting, it is important that some overlapping occur during curing so as to avoid areas of weakness in the belt. Thus, if a mold 21 feet long were used to cure 21 feet of belting, and then another 21 feet, and so on, the boundaries between adjacent 21 foot sections of belting would be very weak.

To avoid such areas of weakness it has become common in the belt-making industry to heat to curing temperature only those portions of platens 52 and 56 that will come into contact with the intermediate and leading end mold sections, with those portions of platens 52 and 56 that contact the trailing end mold section being cooled to about 100° F., that temperature being insufficient to effect curing. In practice, the trailing end mold section (designated by reference numeral 20b in FIG. 5) will be maintained during the curing cycle at approximately 100° F. throughout most of its length, although it will approach 300° F. at the end adjacent the line of intermediate mold sections 20c. This will result in uncured belting along most of the length of the trailing mold section, with a progressively increasing degree of partial curing occurring near the end adjacent the totally cured portions of belting in intermediate mold sections 20c, and finally being totally cured near the junction between trailing end mold section 20b and adjacent intermediate mold section 20c. As will be discussed more fully below, the partially cured trailing end will subsequently be fully cured, so that no discernable junction or point of weakness occurs.

Figure 6:
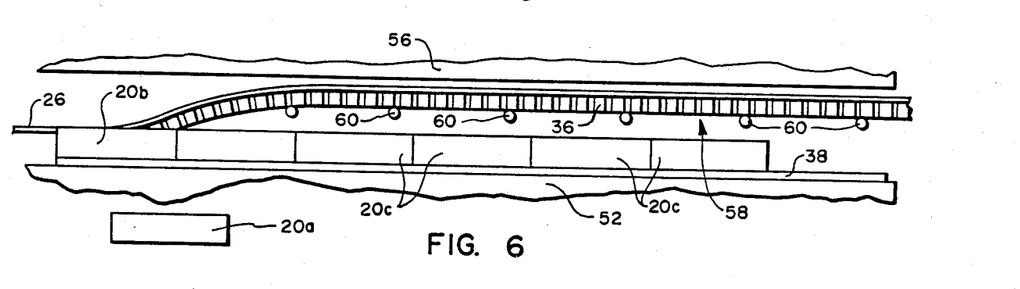
FIG. 6 is a schematic representation similar to FIG. 5, but showing the leading end mold section of the mold assembly being removed in preparation to advance the belting within the press.

Continuing now with a discussion of the Figures, FIG. 6 depicts the condition where the entire length of cured conveyor belting 58 has been removed from the leading end and intermediate mold sections. The belting and side wall material contained in trailing edge mold section 20b are preferably left in the mold, being only partially cured. The inner portion of the leading edge mold section 20a comprising base plates 28, belt pattern mold components 22, and inner side wall mold components 32 are then advantageously removed from the lower platen; base plates 38 and backing bars 38 and outer side wall mold components 34 are left in position. (For convenience of illustration, the schematic drawings of FIGS. 5–8 depict apparent removal of the entire mold section).

Figure 7:
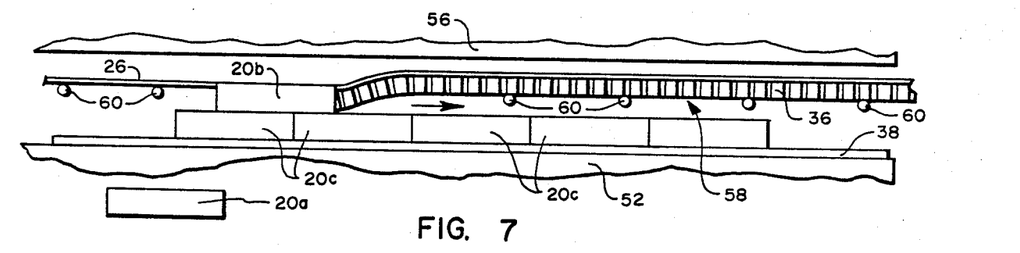
FIG. 7 is schematic representation similar to FIG. 6, but showing the step of advancing the trailing end mold section and belting in the mold assembly.
Figure 8:
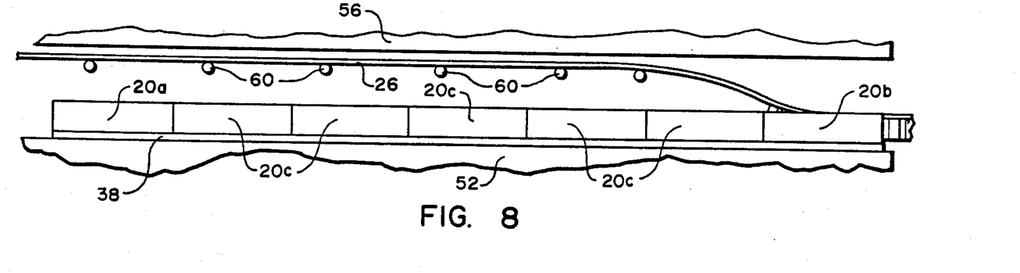
FIG. 8 is a schematic representation similar to FIG. 7 but showing the trailing end mold section of FIGS. 5 and 6 having been advanced to a position as leading end mold section, and showing the leading end mold section of FIG. 5 now placed in position as the trailing end mold section.

Next, the inner portion (again comprising base plates 28, belt pattern mold components 22 and inner side wall mold components 24) of trailing end mold section 20b is lifted onto the immediately adjacent intermediate mold 20c, as shown in FIG. 7, and advanced toward the leading edge of the mold assembly until it is finally dropped into place in the position vacated by the previously leading end mold section 20a. Mold section 20a is then placed into position as the new trailing end mold section, as shown in FIG. 8.

The result of the preceding steps is to advance the formed but only partially cured conveyor belting to the leading end of the press where it will be completely cured. Trailing uncured belting material 26 is advantageously suspended by rods 60 to facilitate placement of additional side wall material in the side wall molds. Finally, belt material 26 is lowered into place, the wedge members placed into position, and the press operated once more to cure those portions of belting and side wall material contained in the leading and intermediate mold sections, the belting and side wall material in mold section 20a, now the trailing end mold section, being again only partially cured as discussed above. The entire process is then repeated as many times as necessary until a desired continuous length of non-linear side wall conveyor belting has been produced.

Portions of the preceding discussion may be better understood by reference to FIGS. 9a and 9b. FIG. 9a illustrates the step of removing cured conveyor belting from the mold assembly beginning with the leading end mold section and working toward the trailing end of the press. (It will be appreciated that the curvature in belting 58 shown in FIG. 9a is exaggerated for purposes of illustration). FIG. 9b illustrates placement of uncured side wall material 54 beneath suspended uncurd belting material 26 and adjacent to the previously formed, but yet substantially uncured non-linear side wall that has been advanced to a position at the leading end of the press. It will be appreciated that a continuous length of side wall material could be utilized in lieu of separate pieces in the manner illustrated.

It will be appreciated from the foregoing discussion that the novel method and apparatus of the present invention provide for the first time for simultaneous curing of conveyor belting and associated non-linear side walls, thereby producing non-linear side wall conveyor belting having superior characteristics of durability. Also, the method and apparatus of the present invention require fewer steps than the conventional processes and will thus be more economical; rather than separately forming and curing the side walls and then affixing them to cured belting, everything may be done in a single step.

Additionally, it will be appreciated that the preferred embodiments of the mold apparatus illustrated and described herein can be utilized in existing presses, without any need for expensive retooling. This permits use of the present invention not only to obtain superior non-linear side wall conveyor belting as compared to that fabricated using conventional apparatus, but it also permits such non-linear side wall conveyor belting to be fabricated economically in virtually any plant that is capable of producing conveyor belting using conventional technology.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A mold for use between platens of a press in fabricating conveyor belting having undulated side walls comprising:

means for supporting uncured conveyor belting material during curing;

inner and outer side wall mold components capable of forming uncured side wall material into an undulated shape, at least one of said inner and outer side wall components being movable with respect to the other between an open position wherein the inner and outer side wall components are spaced apart a sufficient distance to permit placement of uncured side wall material therebetween, and a closed position wherein the adjacent faces of the inner and outer side wall mold components are spaced apart a distance corresponding to a suitable thickness of undulated side wall; and means for supporting formed undulated side wall material in a suitable juxtaposition and orientation for simultaneous curing with the conveyor belting material so that when the mold is placed between the platens of a press, the undulated side wall material and the conveyor belting material will form a unitary bond as they are cured together under suitable conditions of heat and pressure.

2. A mold for use in fabricating conveyor belting as defined in claim 1 wherein the inner side wall mold components are in fixed position with respect to the mold, and the corresponding outer side wall mold components are movable with respect to the inner side wall mold components.

3. A mold for use in fabricating conveyor belting as defined in claim 2 wherein said mold further comprises means for moving said outer side wall mold components to the closed position.

4. A mold for use in fabricating conveyor belting as defined in claim 3 wherein said means for moving the outer side wall mold components to a closed position comprises:

backing support means fixed at a position adjacent to the open position of the outer side wall mold components; and ramp surface means adapted for insertion between said fixed backing support means and the corresponding outer side wall mold components, so that insertion of said ramp surface means results in movement of the outer side wall mold components from said open position to said closed position.

5. A mold for use in fabricating conveyor belting as defined in claim 4 wherein the thickness of undulated side walls formed in the mold can be selected by adjusting the width of the ramp surface means.

6. A mold for use in fabricating conveyor belting having undulated side walls comprising:

means for supporting uncured conveyor belt material during curing;

a pair of inner side wall mold cmponents conforming in shape to a suitable inner undulated side wall configuration;

a pair of corresponding outer side wall mold components conforming in shape to a suitable outer undulated side wall configuration; and means for moving said inner and outer side wall mold components to a closed position wherein adjacent faces of said inner and outer side wall mold components are spaced apart a distance corresponding to a suitable thickness of the undulated side wall to be formed therein, and in suitable alignment with respect to said uncured conveyor belt material so that undulated side walls formed between said closed inner and outer side wall mold components will be cured together with said conveyor belt materials when the mold is placed between the platens of a suitable press, thereby producing side wall conveyor belting having undulated side walls unitarily bonded thereto.

7. A mold for use in fabricating conveyor belting as defined in claim 6 wherein said inner side wall mold components are in a fixed position with respect to said mold, and wherein the outer side wall mold components are movable between an open position sufficiently spaced from the fixed inner side wall mold components to permit placement of substantially straight uncured side wall material adjacent to the inner side wall mold components to be formed into a undulated shape when the outer side wall mold component is moved to the closed position.

8. A mold for use in fabricating conveyor belting as defined in claim 7 wherein said outer side wall mold components move substantially horizontally between said open and closed positions, and wherein the means for moving said outer side wall mold components to a closed position comprises:

backing support means fixed at a position adjacent to the open position of the outer side wall mold components; and wedge means adapted for insertion between said fixed backing support means and the corresponding outer side wall mold components, so that insertion of said wedge means result in movement of the outer side wall mold components from said open position to said closed position.

9. A mold for use in fabricating conveyor belting having undulated side walls comprising:

means for supporting uncured conveyor belt material during curing;

a pair of inner side wall mold components conforming in shape to a suitable inner undulated side wall configuration, said inner side wall mold components being affixed with respect to the means for supporting uncured conveyor belt material during curing such that undulated side walls formed therein are in suitable position and orientation for curing together with said belt material to form undulated side wall conveyor belting;

a pair of corresponding outer side wall mold components conforming in shape to a suitable outer undulated side wall configuration, said outer side wall mold components being movable in a horizontal plane between an open position spaced sufficiently from the corresponding inner side wall mold components to permit insertion of substantially straight uncured side wall material adjacent to the inner side wall mold components, and a closed position where adjacent faces of said inner and outer side wall mold components are spaced apart a distance corresponding to a suitable thickness of undulated side wall to be formed therein;

a pair of backing support members fixed at a position adjacent to the open position of the outer side wall mold components; and wedge means adapted for insertion between said fixed backing support means and the corresponding outer side wall mold components, so that insertion of said wedge means results in movement of the outer side wall mold components from the open position to said closed position, so as to form the side wall material into undulated shape and hold said undulated side wall material in suitable orientation with the conveyor belt material that the undulated side wall material and conveyor belt material will form a unitary bond as they are cured together.

* * * * *

UNITED STATES PATENT AND TRADEMARK OFFICE
CERTIFICATE OF CORRECTION

PATENT NO. : 4,540,357

DATED : September 10, 1985

INVENTOR(S) : Clarence R. Campbell et al.

It is certified that error appears in the above-identified patent and that said Letters Patent is hereby corrected as shown below:

Col. 3, line 43, "cure" should be --cured--

Col. 3, line 50, "7 is schematic" should be --7 is a schematic--

Col. 4, line 31, "an non-linear" should be --a non-linear--

Col. 5, line 45, "and and" should be --and--

Col. 6, line 32, "an non-linear" should be --a non-linear--

Col. 7, line 57, "base plates 38 and backing bars 38" should be --base plates 38 and backing bars 44--

Col. 7, line 61, "mold section)." should be --mold section.)--

Col. 8, line 28, "illustration)." should be --illustration.)--

Col. 8, line 29, "uncurd" should be --uncured--

Col. 9, line 59, "cmponents" should be --components--

Col. 10, line 19, "a undulated" should be --an undulated--

Signed and Sealed this

Seventh Day of January 1986

[SEAL]

Attest:

DONALD J. QUIGG

Attesting Officer

Commissioner of Patents and Trademarks